No. 680,862. Patented Aug. 20, 1901.
J. T. M. HIRCOCK.
TRICYCLE, &c.
(Application filed July 25, 1899.)
(No Model.)
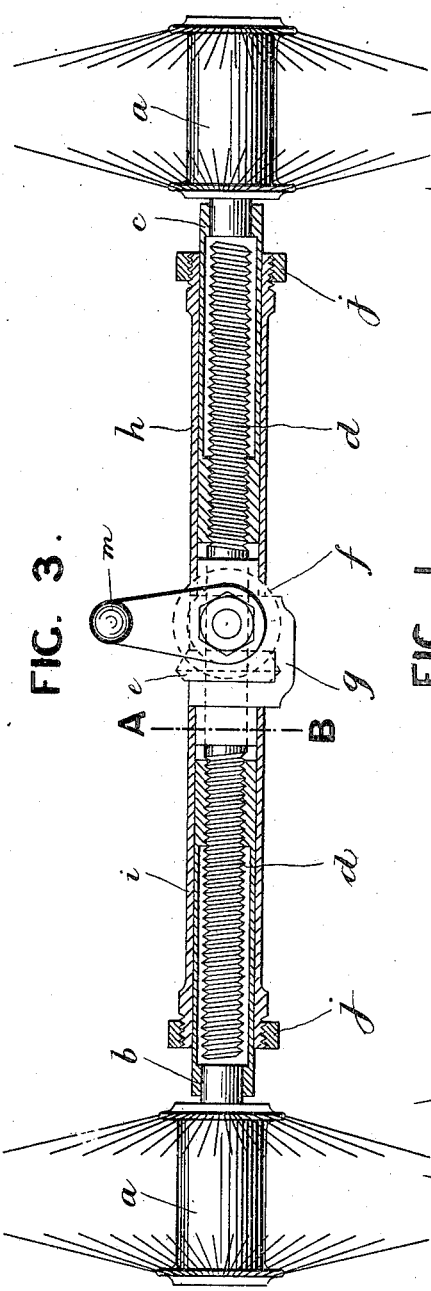
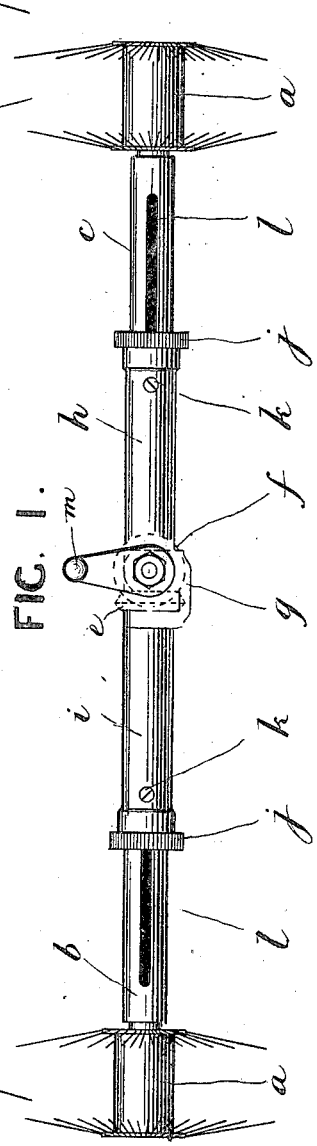
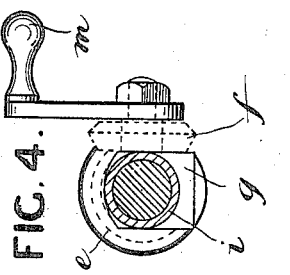
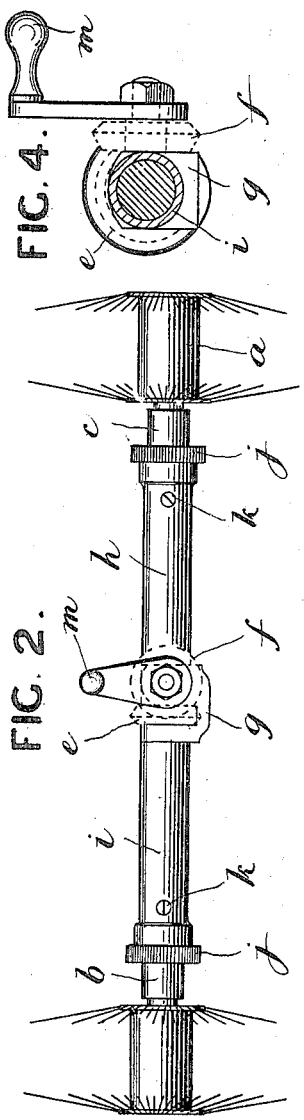
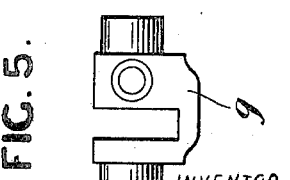
INVENTOR
John Thomas Milton Hircock
BY
ATTORNEYS
WITNESSES:

UNITED STATES PATENT OFFICE.

JOHN THOMAS MILSON HIRCOCK, OF BIRMINGHAM, ENGLAND.

TRICYCLE, &c.

SPECIFICATION forming part of Letters Patent No. 680,862, dated August 20, 1901.

Application filed July 25, 1899. Serial No. 725,103. (No model.)

*To all whom it may concern:*

Be it known that I, JOHN THOMAS MILSON HIRCOCK, residing at 34 Priestley road, Sparkbrook, Birmingham, in the county of Warwick, England, have invented Improvements in Tricycles and other Velocipedes, of which the following is a specification.

My invention has for its object improvements in tricycles and other velocipedes by which I am enabled to easily and quickly decrease the width of the frame, so as to enable a three-wheeled machine or the like to readily enter any narrow place or passage.

In order that my invention may be clearly understood and more easily carried into practical effect, I have appended hereunto three sheets of drawings upon which I have illustrated examples of my method of decreasing and increasing the width of the tread of the wheels or frame of a tricycle or the like.

Figure 1 is a front elevation showing the axle upon which the two front wheels of a tricycle are mounted extended. Fig. 2 is a similar view to Fig. 1, showing the axle contracted or closed. Fig. 3 is an enlarged part-sectional view of the axle, as shown at Fig. 2. Fig. 4 is a cross-sectional view of Fig. 3, taken on the line A B. Fig. 5 is a detached view of the center lug.

In carrying my invention into practice I form the axle upon the ends of which the wheels $a\ a$ are mounted hollow and in two parts $b\ c$, the inner ends being tapped to receive the right and left hand screwed ends of the axle $d$. Mounted on or about the center of this axle $d$ is the gear-wheel $e$, which gears with the gear-wheel $f$, mounted on the bracket or lug $g$, through which the axle $d$ passes. Fitting over the hollow axles $b\ c$ are the sleeves or guides $h\ i$, one of their ends being fixed to the ends of the lug $g$ and the other ends being provided with the adjusting screwed collar $j$. These sleeves are provided with the pegs or pins $k$, which work in the slots $l$, formed in the hollow axles $b\ c$. The handle $m$ is attached to the gear-wheel $f$. It will thus be seen that when this handle is turned in one direction it will impart a revolving motion to the screwed axle $d$, thereby causing the hollow axles $b\ c$ to move outward or expand, and consequently moving the wheels $a\ a$ farther apart into position ready for riding the machine, as shown at Fig. 1; but if the handle $m$ is turned in the reverse direction it will cause the hollow axles $b\ c$ to close or travel nearer together, thereby bringing the wheels $a\ a$ closer together or contracting the length of the axle, as shown at Figs. 2 and 3, so as to enable the machine to readily enter any narrow place or passage. The studs or pegs $k$, which work in the slots $l$, prevent the axles $b\ c$ from revolving when either expanding or contracting the axle. It will be evident that the portion of the axles $b\ c$ upon which the wheels $a\ a$ are mounted may be made in one with these axles instead of being fixed thereto, as shown.

I claim—

1. In combination, the lug $g$, the sleeves or guides $h,\ i$, connected therewith, the non-rotating hollow axles $b,\ c$, movable in the sleeve and carrying the wheels to rotate independently, the screwed spindle journaled in the lug and the gearing for turning the screwed spindle, part of the gearing being supported on the lug, substantially as described.

2. In combination, the guides $h,\ i$, the lug, of substantially U shape located between the inner ends of the guides, the axles moving in the guides, the screw engaging the axles and the gearing carried by the U-shaped lug for turning the screw, one of the gears being located in the cavity of the U and being connected with the screw, substantially as described.

In witness whereof I have hereunto set my hand in presence of two witnesses.

JOHN THOMAS MILSON HIRCOCK.

Witnesses:
 ERNEST HY SALE,
 FREDERICK BUCKLEY.